(12) United States Patent
Shirai et al.

(10) Patent No.: US 6,645,634 B1
(45) Date of Patent: Nov. 11, 2003

(54) MAGNETIC RECORDING MEDIUM AND METHOD FOR MANUFACTURING SAME

(75) Inventors: Shinji Shirai, Nagano (JP); Youichi Tei, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/596,529

(22) Filed: Jun. 19, 2000

(30) Foreign Application Priority Data

Jun. 17, 1999 (JP) .......................................... 11-171619

(51) Int. Cl.$^7$ ................................................ G11B 5/725
(52) U.S. Cl. .................................. 428/421; 428/694 TF; 427/130; 427/131; 427/553; 427/558
(58) Field of Search ......................... 428/421, 694 TF; 427/130, 131, 553, 558

(56) References Cited

U.S. PATENT DOCUMENTS

| | | | | |
|---|---|---|---|---|
| 3,755,224 A | * | 8/1973 | Lutz, Jr. ................. | 260/23 EP |
| 3,861,949 A | * | 1/1975 | Onozuka et al. .......... | 117/138.5 |
| 5,030,478 A | * | 7/1991 | Lin et al. ................. | 427/54.1 |
| 5,498,457 A | * | 3/1996 | Ishihara et al. ........... | 428/65.4 |
| 5,587,217 A | | 12/1996 | Chao et al. ............... | 428/65.4 |

FOREIGN PATENT DOCUMENTS

JP 10-46171 2/1998

OTHER PUBLICATIONS

Judy Lin et al., "Lubricants For Magnetic Rigid Disks", 1990, pp. 599–604, Proceedings of the Japan International Tribology Conference, Nagoya, 1990.

* cited by examiner

Primary Examiner—Steven A. Resan
(74) Attorney, Agent, or Firm—Rossi & Associates

(57) ABSTRACT

To avoid troubles associated with high-density recording and fast transfer rate, such as decomposition of lubricant involved in a low floating height magnetic head and migration of lubricants involved in high speed rotation of a magnetic recording medium, and to provide a magnetic recording medium which achieves stable resistance to environment and stable lubricating characteristics, a magnetic recording medium includes a base body and the layers formed on the base body, including a non-magnetic metal underlayer, a magnetic layer, a protective layer, and a lubricant layer. The lubricant of the lubricant layer includes a perfluoropolyether liquid lubricant having an alcohol end group(s) and a perfluoropolyether liquid lubricant having an amine end group(s) of tertiary amine structure.

18 Claims, 1 Drawing Sheet

MAGNETIC RECORDING MEDIUM AND METHOD FOR MANUFACTURING SAME

FIELD OF THE INVENTION

The present invention relates to a magnetic recording medium, which is installed in an external storage device of a computer, and a method for manufacturing such a magnetic recording medium. In particular, the invention relates to an improvement of a magnetic recording medium by means of excellent liquid lubricant applied on the surface of the magnetic recording medium.

BACKGROUND ART

A magnetic recording medium is commonly used in a fixed magnetic disc drive as a memory of a computer. In the fixed magnetic disc drive, a CSS (contact start and stop) system is employed where a magnetic head of the disc drive floats when the magnetic recording medium rotates and the magnetic head comes into contact with the surface of the magnetic recording medium when a driving motor which drives to rotate the magnetic recording medium stops.

The magnetic recording medium comprises an underlayer and a magnetic layer formed by dc sputtering on a hard base body. The surface of the magnetic layer is covered with a carbon protective film in order to prevent wear of the magnetic layer and also to reduce frictional force between the magnetic recording medium and the magnetic head. Generally used material for the surface protective layer to prevent friction and wear due to sliding between the magnetic recording medium and the magnetic head includes diamond-like carbon (DLC), amorphous carbon, or DLC with a small amount of additive of N or Si. In the DLC, diamond-like property exhibiting high hardness is raised and a proportion of bonding in diamond structure is larger than that of bonding in graphite structure.

The surface of the protective layer formed of the diamond-like carbon is covered with a thin oxide film having a functional group, such as reactive carbonyl group, carboxyl group, or hydroxyl group, and contaminants actively adsorbs here and bonds to the functional group in the protective layer. Therefore, the surface of the protective layer of the conventional magnetic recording medium is wholly covered with a lubricant, preventing the surface from adsorbing contaminant such as harmful gas or organic substance, and also improving lubrication characteristics, in an attempt to obtain a magnetic recording medium with excellent CSS endurance and stability.

The lubricant layer used for improving lubricating characteristics of the surface of a magnetic recording medium is required to be stably formed with uniform thickness on the surface of the protective film. It is also important that the lubricant exhibit high adhesiveness and bonding strength with the protective film. To increase the adhesiveness, a lubricant has been used which is a perfluoropolyether having a hydroxyl group or piperonyl group at an end or ends of the molecule. Such a lubricant is available in the trade name Z-DOL or AM2001 from Ausimont S.p.A.

The perfluoropolyether lubricant has a poor lubricating characteristic if its molecular weight is too low, and tends to adhere to the magnetic head if the molecular weight is too high. Thus, the perfluoropolyether lubricant having the weight average molecular weight (MW) of 1,500 to 5,500 has been conventionally used. When the molecules with such relatively large molecular weight is applied in the thickness of several tens of Angstroms, gaps between molecules is generated and it becomes difficult for the lubricant layer to wholly cover the surface of the protective layer. Thus, the conventional perfluoropolyether lubricant requires thickness of the lubricant layer of more than 50 Å, which makes it difficult to prevent the magnetic recording medium from adhesion with the magnetic head.

With high-density recording in recent years, the floating height of the magnetic head has been reduced, and the structure of the magnetic head has been changed to employ a low-floating type magnetic head, such as MR head, in place of the heads of conventional type. The material of low-floating head is likely to undergo a catalytic action or generate heat due to friction, which causes decomposition of the perfluoropolyether lubricant in the principal chain portion (ether portion). The decomposed substances or corrosive components of the gas adsorbed on the disc surface are transferred to the surface of the magnetic head, and floating characteristics of the magnetic head is disturbed, causing reduction in the reproduction output. In addition, the decomposed perfluoropolyether lubricant, cannot maintain its lubricating characteristics, causing wear of the protective film, and in the worst case, head crush takes place.

Further, the rotating speed of the magnetic recording medium is increasing from a conventional speed of about 7,200 rpm to a higher speed of 7,200 to 15,000 rpm. As a result, a phenomenon of spin-migration is appearing, that is, the lubricant on the surface of the magnetic recording medium moves or scatters toward a radially outer portion due to a centrifugal force. If the migration becomes excessive, harmful adhesion or, in the worst case, head crash may occur.

As described above, the conventional technologies may deteriorate the performance of a fixed magnetic recording disc drive in a large extent. Although various attempts have been made to use various perfluoropolyether lubricants so as to solve the above-described problems, such a technology that meets all of the above requirements had not been established.

It is therefore an object of the present invention to solve the problems involved in high density recording and high transfer rate wherein decomposition of the lubricant due to low-floating-height of the magnetic head and migration phenomenon due to high-speed rotation arise. It is also an object of the invention to provide a magnetic recording medium that exhibits stable resistance to environmental conditions and stable lubricating performance for a prolonged time. It is another object to provide a method for manufacturing such a magnetic recording medium.

SUMMARY OF THE INVENTION

The magnetic recording medium of the invention solves the above-described problems involved in the use of the recording medium together with a magnetic head in a fixed magnetic disc drive. To accomplish the above objects, the present invention provides a magnetic recording medium comprising a base body, a non-magnetic metal underlayer formed on the base body, a magnetic layer formed on the non-magnetic metal underlayer, a protective layer formed on the magnetic layer, and a lubricant layer formed on the protective layer. The lubricant layer of the invention contains a first liquid lubricant and a second liquid lubricant, wherein the first liquid lubricant contains at least one perfluoropolyether having one or two alcohol end groups, selected from a group consisting of perfluoropolyethers represented by general formulas (I), (II) and (III), the general formulas (I), (II) and (III) being expressed by

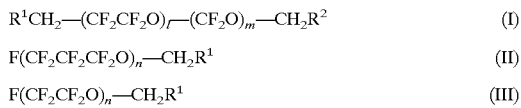

where each of $R^1$ and $R^2$ is independently an end group, each of l and m is 0 or an integer excepting the case l=m=0, and n is an integer, and the second liquid lubricant contains at least one perfluoropolyether having one or two tertiary amine end groups, selected from a group consisting of perfluoropolyethers represented by general formulas (IV), (V) and (VI), the general formulas (IV), (V) and (VI) being expressed by

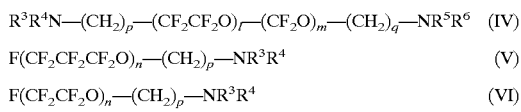

where each of $R^3$, $R^4$, $R^5$, and $R^6$ is independently an end group excluding a hydrogen atom, each of l, m, p and q is 0 or an integer excepting the case l=m=0, and n is an integer.

Advantageously, the lubricant layer is formed of a mixed liquid lubricant including the first liquid lubricant containing the perfluoropolyether having alcohol end group(s) and the second liquid lubricant containing the perfluoropolyether having tertiary amine end group(s) which are defined above.

Alternatively, the lubricant layer is comprised of a double layer including a first layer formed of the first liquid lubricant containing the perfluoropolyether having alcohol end group(s) and a second layer formed of the second liquid lubricant containing the perfluoropolyether having tertiary amine end group(s).

The perfluoropolyether having tertiary amine end group(s) has preferably a weight average molecular weight of 1,500 to 15,000 and the perfluoropolyether having alcohol end group(s) has preferably a weight average molecular weight of 1,500 to 5,500.

Advantageously, the bonded portion in the lubricant layer which is, strongly bonded with the protective layer is in a proportion of 30 to 100% with respect to a sum of the bonded portion and the mobile portion which is not strongly bonded to the protective layer and mobile relative to the protective layer.

A manufacturing method of a magnetic recording medium in the present invention comprises steps of laminating a non-magnetic metal underlayer on a base body, laminating a magnetic layer on the non-magnetic metal underlayer, laminating a protective layer on the magnetic layer, and laminating a lubricant layer on the protective layer by applying the first liquid lubricant containing the perfluoropolyether having alcohol end group(s) and a second layer formed of the second liquid lubricant containing the perfluoropolyether having tertiary amine end group(s), wherein the first and the second liquid lubricants are defined above.

Advantageously, the step of applying the liquid lubricants is performed by applying a mixed liquid containing the first liquid lubricant and the second liquid lubricant.

Preferably, the step of applying the mixed liquid is performed by applying a mixed liquid by means of dip-coating or spin-coating, the mixed liquid containing the first liquid lubricant and the second liquid lubricant, and being diluted with a solvent.

Alternatively, the step of applying the liquid lubricants is performed in two steps in any order: applying a liquid including the first liquid lubricant and separately applying a liquid including the second liquid lubricant.

Preferably, the two steps include a step of applying a first diluted liquid by means of dip-coating or spin-coating, the first diluted liquid being the first liquid lubricant diluted with a solvent, and a step of applying a second diluted liquid by means of dip-coating or spin-coating, the second diluted liquid being the second liquid lubricant diluted with a solvent.

Advantageously, the method of the invention further comprises a step of heating or ultraviolet ray irradiation such that a bonded portion in the lubricant layer is in a proportion of 30 to 100% with respect to a sum of the bonded portion and a mobile portion.

BRIEF DESCRIPTION OF THE DRAWINGS

The invention will be described in greater detail with reference to certain preferred embodiments thereof and the accompanying FIG. 1, which is a schematic perspective view showing a laminate structure of a typical magnetic recording medium.

EMBODIMENTS OF THE INVENTION

Figure 1:
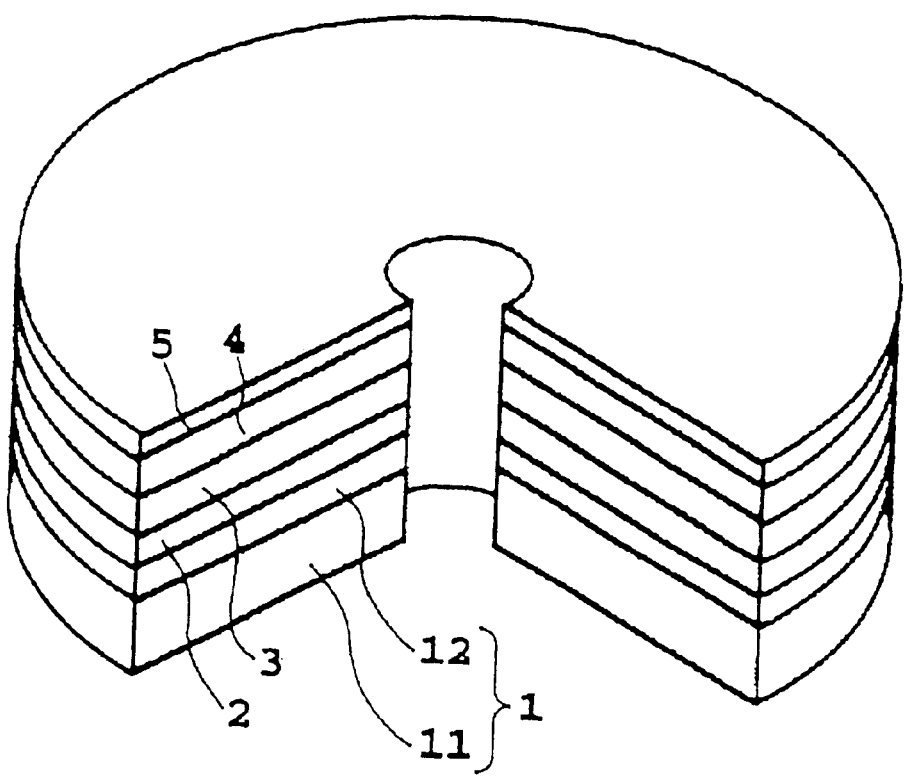

The magnetic recording medium of the invention comprises, as shown in FIG. 1, a non-magnetic metal underlayer 2 formed on a base body 1, a magnetic layer 3 which is a film for magnetic recording, a protective layer 4, and a lubricant layer 5.

The base body 1 may have a material constitution which has been commonly used, that is, a non-magnetic substrate 11 of an aluminum alloy and a non-magnetic metal layer (a plated layer) of Ni—P plated by electroless plating, for example. Alternatively, the material for the base body 1 may be glass or ceramics.

The non-magnetic metal underlayer 2 laminated on the base body 1 is formed of Cr by dc sputtering method. CrTi, CrSi, CrMo or CrAl may also be used in place of Cr.

The magnetic layer 3 laminated on the non-magnetic underlayer 2 is preferably formed of a cobalt alloy, which is a ferromagnetic alloy, by dc sputtering method. The cobalt alloy may be selected from Co—Cr—Ta, Co—Cr—Pt, and Co—Cr—Pt—Ta, for example.

The protective layer 4 laminated on the magnetic layer 3 is formed by a sputtering method or a CVD method, for example. Material for the protective layer may be selected from diamond-like carbon (DLC), amorphous carbon, or diamond-like carbon with a small amount of additive of N or Si, and the like.

The lubricant layer 5, which is provided for improving lubricating characteristics of the surface of the magnetic recording medium, is formed by spin-coating or dip-coating (including pulling-up method and draining method) on the protective layer 4. The lubricant layer 5 is formed by a combination of a first liquid lubricant and a second liquid lubricant. The principal chains of the first and second liquid lubricants are perfluoropolyether, while the first liquid lubricant has an alcohol end group or groups and the second liquid lubricant has a tertiary amine end group or groups.

The combination may be a mixed liquid lubricant that is a mixture of the two liquid lubricants, or a double-layered structure which includes a layer of the first liquid lubricant and a separate layer of the second liquid lubricant.

The first liquid lubricant, which is a perfluoropolyether having alcohol end group(s), is selected from the group consisting of general formulas (I), (II) and (III):

$$R^1CH_2-(CF_2CF_2O)_l-(CF_2O)_m-CH_2R^2 \quad (I)$$

$$F(CF_2CF_2CF_2O)_n-CH_2R^1 \quad (II)$$

$$F(CF_2CF_2O)_n-CH_2R^1 \quad (III)$$

where each of $R^1$ and $R^2$ is independently an end group, each of l and m is 0 or an integer excepting the case l=m=0, and n is an integer.

The second liquid lubricant, which is a perfluoropolyether having a tertiary amine end group(s), is selected from the group consisting of general formulas (IV), (V) and (VI):

$$R^3R^4N-(CH_2)_p-(CF_2CF_2O)_l-(CF_2O)_m-(CH_2)_q-NR^5R^6 \quad (IV)$$

$$F(CF_2CF_2CF_2O)_n-(CH_2)_p-NR^3R^4 \quad (V)$$

$$F(CF_2CF_2O)_n-(CH_2)_p-NR^3R^4 \quad (VI)$$

where each of $R^3$, $R^4$, $R^5$, and $R^6$ is independently an end group excluding a hydrogen atom, each of l, m, p and q is 0 or an integer excepting the case l=m=0, and n is an integer.

The surface of a carbon protective layer forming the protective layer 4 is uniformly covered with a thin oxide film having a functional group, such as reactive carbonyl group, carboxyl group, or hydroxyl group. To obtain the lubricant layer having stronger adhesiveness and bonding strength with the surface of the carbon protective layer exhibiting weak acidity, it is most preferable to apply a perfluoropolyether which has a polar functional group exhibiting weak basicity.

Though amine may be generally considered as a structure of a functional group that exhibits weak basicity, primary and secondary amines exhibit relatively strong alkalinity. Therefore, if a perfluoropolyether liquid lubricant having those kinds of amine are applied as a lubricant on the surface of a protective layer, while bonding strength of the lubricant would be increased, such lubricants also have a tendency to attract harmful gases in an atmospheric air and in the disc drive, and may cause reduction in reproduction output and head crush. In addition, a perfluoropolyether liquid lubricant including primary or secondary amine structure involves a problem in stability during leaving at room temperature or at heated condition.

It is therefore important that a functional group exhibiting weak basicity has a structure $$-(CH_2)_p-NR^3R^4 \text{ or } -(CH_2)_q-NR^5R^6$$

as in the formulas (IV), (V) or (VI); here each of p and q is 0 or and integer, and each of $R^3$, $R^4$, $R^5$ and $R^6$ independently represents any end group excluding a hydrogen atom. Preferably, the substituents $R^3$, $R^4$, $R^5$ and $R^6$ of the tertiary amine include a conjugated bond acting π—π electron interaction with the graphite structure in the carbon protective layer. Such substituents allow to further increase the adhesiveness between the carbon protective layer and the lubricant layer.

Examples of such tertiary amines exhibiting weak basicity are given in Chemical Formula 1 and Chemical Formula 2 below. In Chemical Formula 1 and Chemical Formula 2, each of l, m and n represents 0 or and integer.

Chemical Formula 1

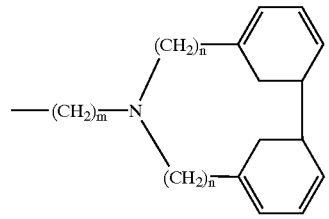
(1-1)

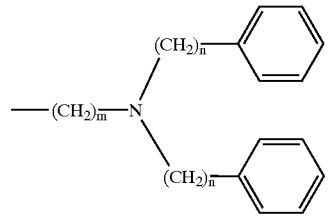
(1-2)

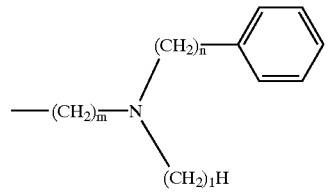
(1-3)

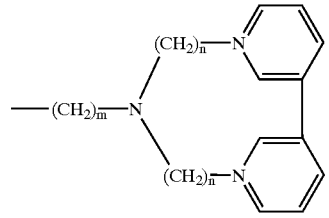
(1-4)

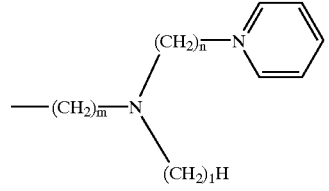
(1-5)

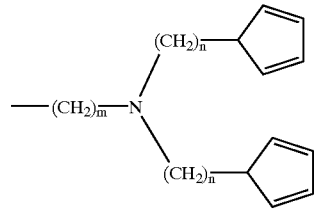
(1-6)

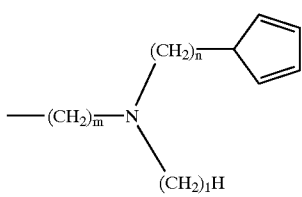

(1-7)

Chemical Formula 2

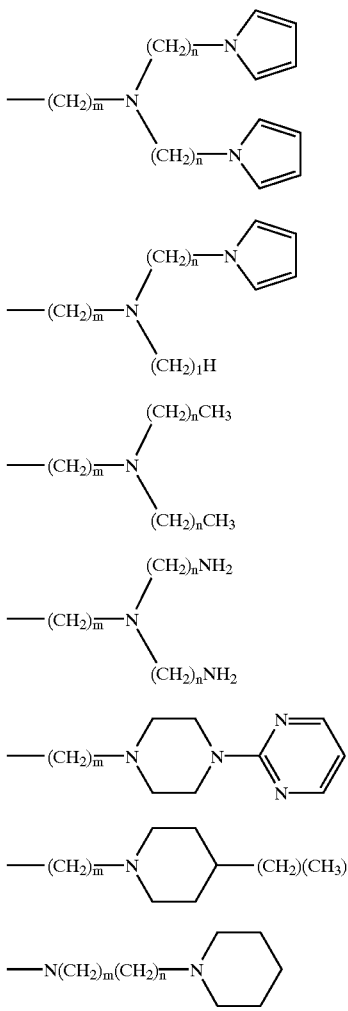

(2-1)

(2-2)

(2-3)

(2-4)

(2-5)

(2-6)

(2-7)

The perfluoropolyether lubricant conventionally used in the lubricant layer has a poor lubricating characteristics if molecular weight is too low, and tends to adhere to the magnetic head if the molecular weight is too high. Thus, perfluoropolyether lubricant having the weight average molecular weight (MW) of 1,500 to 5,500 has been used. On the other hand, the perfluoropolyether lubricant of the invention having an amine end group(s) with a tertiary amine structure and weak basicity, shows a stronger bonding strength with the carbon protective layer, and therefore the molecular weight may be in a wider range of 1,500 to 15,000 MW, without causing the problem of adhesion, and therefore, the magnetic recording medium causing less wear and performing excellent lubricating characteristics is obtained.

In the present invention, a proportion of bonded portion of the lubricant which is strongly bonded to the protective layer is controlled by treating the laminated lubricant layer 5, with heating or ultraviolet ray irradiation. The bonded proportion (bonded ratio) is easily controlled by adjusting temperature or time of the heating, or wavelength, power, ozone generating rate, or period of the ultraviolet ray irradiation. The bonded proportion of the lubricant layer with the protective layer represents a ratio of the portion of the perfluoropolyether lubricant which is strongly bonded to the carbon protective layer to the sum of the bonded portion and a mobile portion of the lubricant that is weakly bonded to the carbon protective layer. The bonded proportion is obtained in the following manner. First, the C—F peak absorbance detected at 1290 to 1260 $cm^{-1}$ by FT-IR high-sensitivity reflection method is measured with respect to a magnetic recording medium provided with the lubrication layer. Then, the medium is immersed in fluorocarbon (for example, PF-5060 available from 3M Ltd. or ZS-100 available from Ausimont S.p.A.) with ultrasonic wave for five minutes, and the C—F peak absorbance after the immersion is measured again, so as to obtain a ratio of the C—F peak absorbances before and after the immersion. The obtained ratio is the bonded proportion. The bonded proportion in the invention is preferably controlled in a range of 30 to 100%.

As described earlier, the surface of the carbon protective film is covered with a very thin oxide film having a functional group, such as reactive carbonyl group, carboxyl group, or hydroxyl group, and exhibits surface property with weak acidity. Therefore, a combination of the perfluoropolyether having a functional group which exhibits weak basicity and has a conjugated bond, and the perfluoropolyether having a alcohol end group applied on the carbon protective layer, provides a far strong bonding based on chemical adsorption accompanying chemical bond not only based on physical adsorption in conventional technology, while retaining flexibility of the liquid lubricant.

Therefore, the unfavorable adhesion between the magnetic recording medium and the magnetic head, which is caused by transfer of the liquid lubricant to the magnetic head arisen from low floating height and change of the magnetic head structure for complying with high recording density, is made less likely to occur. Also, spin-migration in which the lubricant moves or scatters toward radially outer portion of the disc in high-speed rotation is hard to occur. Moreover, various phenomena due to reduced bonding strength between the carbon protective layer and the lubricant layer hardly occur. Namely, the phenomena accompanied by decrease in bonding strength in high temperature and high humidity environment, for example, adhesion enhancement and coagulation of harmful gas contaminant in the disc drive, and head-crush due to decomposition of the lubricant are restrained. Thus, stable lubricating characteristics hold for a prolonged time.

Some examples of embodiments of the invention are hereinafter described in detail.

Synthesis of Perfluoropolyether Having an Amine End Group(s)

Perfluoropolyether having an amine end group(s) was synthesized as follows.

(a) Trifluoromethylsulfonization

Trifluoromethanesulfonic anhydride (1.0 g) was dissolved in HCFC225 (30 ml). Perfluoropolyether (10.0 g) in which functional end groups are hydroxyl groups (—OH):

$HOH_2C—(CF_2CF_2O)_l—(CF_2O)_m—CH_2OH$(Fomblin Z-DOL available from Ausimont S.p.A.) and pyridine (0.1 g) are dissolved in a separate HCFC225 (80 ml). Into the resultant solution, the solution of trifluoromethanesulfonic anhydride cooled at 0° C. was slowly added. The mixture of the two solutions is stirred for 10 hours holding the temperature below 0° C. The end point of the reaction was confirmed by NMR. The liquid thus obtained was washed by pure water and HCFC225 was removed by distillation, to obtain the object of this process, triflate (8.8 g):

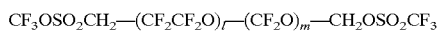

The process up to this step is represented in a generalized form corresponding to the invention as follows.

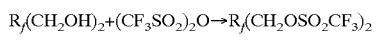

where $R_f$ represents the perfluoropolyether portion which is a principal chain in formulas (I) to (VI).

The obtained triflate was subjected to reaction with each of various amino compounds to obtain perfluoropolyether having an amine end group(s).

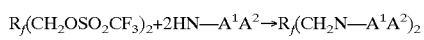

where each of $A^1$ and $A^2$ represents independently any end group and is same as any one of $R^3$, $R^4$, $R^5$ and $R^6$ indicated earlier.

According to the method described in the above synthesis example, perfluoropolyether decorated with an amino end group(s) of the following three species were obtained. The perfluoropolyether having an amino end group(s) may be produced by means of other various methods not described here.

1. Synthesis of Perfluoropolyether Having a Piperidinylethylamine End Group(s)

The triflate (5.0 g) obtained by Synthesis (a), piperidinylethylamine (0.5 g) and HCFC225 (50 ml) were put into an autoclave, with nitrogen introduced thereafter, and then were reacted with each other at 90° C. for 200 hours. It was confirmed by NMR that any raw substance was left. The resulted substance was washed by water and ethanol. Removing HCFC225 by distillation, 2.1 g of perfluoropolyether having piperidinylethylamine end group(s) (Chemical Formula 3, below) was obtained.

Chemical Formula 3

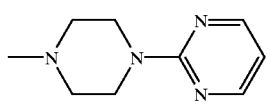

2. Synthesis of Perfluoropolyether Having a Diethylamine End Group(s)

The triflate (5.0 g) obtained by Synthesis (a), diethylamine (0.4 g) and HCFC225 (50 ml) were put into an autoclave, for nitrogen substitution, and then were reacted with each other at 90° C. for 100 hours. It was confirmed by NMR that any raw substance was left. The resulted substance was washed by water and ethanol. Removing HCFC225 by distillation, 2.1 g of perfluoropolyether having diethylamine end group(s) (Chemical Formula 4, below) was obtained.

Chemical Formula 4

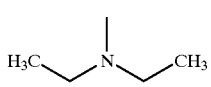

3. Synthesis of Perfluoropolyether Having a Diphenylmethylamine End Group(s)

The triflate (5.0 g) obtained by Synthesis (a), diphenylmethylamine (0.4 g) and HCFC225 (50 ml) were put into an autoclave, for nitrogen substitution, and then were reacted with each other at 90° C. for 100 hours. It was confirmed by NMR that any raw substance was left. The resulted substance was washed by water and ethanol. Removing HCFC225 by distillation, 2.1 g of perfluoropolyether having diphenylmethylamine end group(s) (Chemical Formula 5, below) was obtained.

Chemical Formula 5

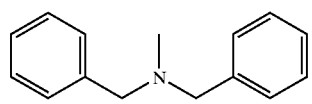

Examples 1 to 12

Twelve non-magnetic substrates 11 of Al—Mg alloy were prepared, and a non-magnetic metal layer 12 having a thickness of 13 µm was formed by plating each of the non-magnetic substrates with Ni—P by electroless plating. Then the surface of the non-magnetic metal layer was polished so that the surface roughness Ra became 10 Å. Subsequently, grooves of substantially concentric circles were formed by texturing using diamond slurry, so that the surface roughness Ra became 13 µm.

The resulted base body 1 was washed, and then a non-magnetic metal underlayer 2 of Cr having a thickness of 500 Å was formed by dc sputtering on the base body. Then, a magnetic layer 3 of 82Co-14Cr-4Ta having a thickness of 300 Å and a protective layer 4 of diamond-like-carbon (DLC) having a thickness of 100 Å were sequentially formed on the underlayer.

The layered structure resulted by the steps of sputtering was then subjected to tape burnishing, to provide magnetic recording media having coating with lubricant on the protective layer in the following way. Four kinds of mixed liquid lubricants were prepared by mixing the perfluoropolyether having piperidinylethylamine end group(s) synthesized by above-described method and a perfluoropolyether having alcohol end group(s) (for example, Fomblin Z-DOL available from Ausimont S.p.A., or DEMNUM-SA available from Daikin Industries, Ltd.), with four a mixing ratios indicated in Table 1. Each of the mixed liquid lubricants was diluted using fluorocarbon (for example, PF-5060 available from 3M Ltd., or ZS-100 available from Ausimont S.p.A.) as a solvent, so that the concentration of the lubricant became 0.04 wt. %. The diluted mixed liquid lubricant was applied on the protective layer 4 by dip-coating, so that the film thickness of the lubricant layer became 20 Å, to produce a magnetic recording medium.

Three magnetic recording media having bonded proportions of 30, 60, and 100% were fabricated for each of the mixing ratios of the mixed liquid lubricants. The bonded proportion is a proportion of the perfluoropolyether that is strongly bonded to the protective layer with respect to the sum of the strongly bonded perfluoropolyether and the perfluoropolyether that is weakly bonded to the protective layer and therefore mobile. The bonded proportion was adjusted by controlling temperature and time during heat treatment of the laminated lubricant layer.

Examples 13 to 24

The magnetic recording media of Examples 13 to 24 were fabricated in the same manner as those of Examples 1 to 12 except that the mixed liquid lubricants used in Examples 13 to 24 were mixtures of the perfluoropolyether having diethylamine end group(s) and the perfluoropolyether having alcohol end group(s) (for example, Fomblin Z-DOL available from Ausimont S.p.A., or DEMNUM-SA available from Daikin Industries, Ltd.), with the mixing ratios indicated in Table 2.

Examples 25 to 36

The magnetic recording media of Examples 25 to 36 were fabricated in the same manner as those of Examples 1 to 12 except that the mixed liquid lubricants used in Examples 25 to 36 were mixtures of the perfluoropolyether having diphenylmethylamine end group(s) and the perfluoropolyether having alcohol end group(s) (for example, Fomblin Z-DOL available from Ausimont S.p.A., or DEMNUM-SA available from Daikin Industries, Ltd.), with the mixing ratios indicated in Table 3.

Comparative Examples 1 and 2

The magnetic recording medium of Comparative Examples 1 and 2 were fabricated in the same manner as those of Examples 1 to 12 except that the liquid lubricants used in the Comparative Examples 1 and 2 did not include the perfluoropolyether having an amine end group, and were composed of a perfluoropolyether having an alcohol end group(s) (for example, Fomblin Z-DOL available from Ausimont S.p.A. or DEMNUM-SA available from Daikin Industries, Ltd.) with the bonded proportions of 30 and 60%.

Comparative Examples 3 and 4

The magnetic recording medium of Comparative Examples 3 and 4 were fabricated in the same manner as those of Examples 1 to 12 except that the liquid lubricants used in the Comparative Examples 3 and 4 did not include the perfluoropolyether having an amine end group, and were composed of a perfluoropolyether having an piperonyl end group (for example, Fomblin AM2001 available from Ausimont S.p.A.) with the bonded proportions of 30 and 60%.

Tables 1 to 3 include the mixing ratios of the perfluoropolyether having an amine end group(s) to the perfluoropolyether having an alcohol end group(s) in the Examples 1 to 36. The bonded proportions in the Examples and Comparative Examples are indicated in Tables 1 to 4.

Evaluation of the Magnetic Recording Media

Evaluation of the lubricant layer of each of the magnetic recording media of Examples 1 to 36 and Comparative Examples 1 to 4 was conducted in the following way. The results of the evaluations are shown in Tables 1 to 4.

First Evaluation

The C—F peak absorbance detected at 1290 to 1260 cm$^{-1}$ by FT-IR high-sensitivity reflection method was obtained with respect to each of the magnetic recording media of Examples and Comparative Examples fabricated in the manner described above. Then, the medium was subjected to the immersion with ultrasonic wave in fluorocarbon (for example, PF-5060 available from 3M Ltd., or ZS-100 available from Ausimont S.p.A.) for 5 minutes. The C—F peak absorbance of the medium after the immersion was measured again, so as to obtain the bonded proportion based on a ratio of the absorbance before and after the immersion.

Second Evaluation

The second and the third evaluations estimate lubricating characteristics.

The coefficients of dynamic friction $\mu_I$ and $\mu_L$ of the above-described Examples 1 to 36 and Comparative Examples 1 to 4 were obtained in the following way. A magnetic head with a head load of 3.5 gf was caused to slide on the surface of the magnetic recording medium at a radial position of 18.5 mm, with a rotating speed of 1 rpm, and the coefficient of dynamic friction $\mu_I$ was measured during sliding.

Then, the medium was rotated at a rotating speed of 100 rpm for 1 hour. Subsequently, the rotating speed was reduced to 1 rpm and the coefficient of dynamic friction $\mu_L$ was measured during the rotating speed.

Third Evaluation

The magnetic recording medium was installed in an actual magnetic disc drive, and the initial value of the coefficient of dynamic friction $\mu_I$ (denoted as CSS-$\mu_I$) was measured using a magnetic head similar to the one used in the second evaluation. Then, 20,000 times of CSS operation were repeated under each of the conditions of ordinary temperature/humidity (25° C./40%RH) and the condition of 60° C./80%RH. After the 20,000 times of operation under the condition of 60° C./80%RH, coefficient of dynamic friction $\mu_L$ (denoted as CSS-$\mu_L$) was measured, and contamination of the magnetic head was observed under an optical microscope.

As is apparent from Tables 1 to 4, the coefficients of dynamic friction increased very little after the operations, and no contamination of magnetic head was observed, with respect to the magnetic recording media (Examples 1 to 36) each coated with the mixed liquid lubricant composed of a mixture of the perfluoropolyether lubricant having the end group(s) substituted by a tertiary amine structure with weak basicity and the perfluoropolyether lubricant having alcohol end group(s).

On the other hand, Comparative Examples 1 to 4 each coated with the perfluoropolyether lubricant having an alcohol end group(s) or a piperonyl end group(s) alone, which is a conventional lubricant, showed remarkable increase in coefficients of dynamic friction and contamination of the magnetic head.

Fourth Evaluation

The fourth evaluation estimated migration.

Each of the magnetic recording media (Examples 1 to 36 and Comparative Examples 1 to 4) was installed in a magnetic disc drive equipped with the similar magnetic head as in the second evaluation, and kept rotating at a high speed of 10,000 rpm for 500 hours under the condition of 80° C./80%RH. The film thickness of the lubricant in each of the magnetic recording media was measured after the rotation at a radially inner position of r=20 mm and at the radially outermost position of r=45 mm.

The lubricant of the invention (in Examples 1 to 36) moves or scatters outward very little as compared with the conventional lubricant (in Comparative Examples 1 to 4), owing to enhanced banding strength in the magnetic recording media of the invention. The result of migration evaluation of the lubricant of the invention are shown in FIGS. 1 to 3.

On the contrary, in the magnetic recording medium coated with the perfluoropolyether lubricant having an alcohol end group(s) alone gave rise to a large difference between the thicknesses at inner position and outer position, which indicates that movement or scattering of the lubricant toward radially outer portion was significant.

Fifth Evaluation

The fifth evaluation estimates adsorption of gases.

$SO_2$ gas was used for estimating adsorption of contaminant gas on the surface of the magnetic recording medium. Each of the magnetic recording media was left for 24 hours under 0.1 ppm of $SO_2$ gas generation using a $SO_2$ permeation tube of a standard gas generator "Permeator" available from Gastech Co. Ltd. Then, $SO_2$ component adsorbed on the magnetic recording medium was measured quantitatively by ion chromatography.

As is apparent from the adsorption evaluation in Tables 1 to 4, in the magnetic recording medium coated with the lubricant composed of a mixture of the perfluoropolyether having an end group(s) substituted by a tertiary amine structure exhibiting weak basicity and the perfluoropolyether having an alcohol end group(s), the lubricant strongly bonds with reactive adsorption sites on the surface of the carbon protective layer and covers the surface, and therefore an acid gas, which is a contaminant component of the external gases, is prevented from adsorbing on the surface of the medium.

On the other hand, the magnetic recording medium only using the perfluoropolyether having an alcohol end group(s) resulted in a large amount of acid gas adsorption as revealed in the gas adsorption evaluation.

TABLE 1

| lubricant | mixing ratio amine | mixing ratio alcohol | Example | Evaluation 2 bonded proportion % | coefficient of dynamic friction $\mu I$ | coefficient of dynamic friction $\mu L$ | Evaluation 3 CSS $\mu I$ | Evaluation 3 CSS $\mu L$ | head contamination | Evaluation 4 migration inner portion | Evaluation 4 migration outer portion | Evaluation 5 $SO_2$ adsorption $\mu g/m^2$ |
|---|---|---|---|---|---|---|---|---|---|---|---|---|
| piperadinyl- | 10 | 0 | 1 | 30 | 0.35 | 0.41 | 0.23 | 0.37 | none | 19.3 | 20.3 | 2.5 |
| ethylamine | | | 2 | 60 | 0.32 | 0.39 | 0.25 | 0.38 | none | 19.7 | 20.0 | 2.3 |
| end group/ | | | 3 | 100 | 0.36 | 0.43 | 0.24 | 0.35 | none | 19.7 | 20.1 | 1.8 |
| alcohol | 8 | 2 | 4 | 30 | 0.34 | 0.40 | 0.25 | 0.38 | none | 19.0 | 20.4 | 2.3 |
| end group | | | 5 | 60 | 0.31 | 0.39 | 0.23 | 0.35 | none | 19.4 | 20.3 | 2.0 |
| | | | 6 | 100 | 0.36 | 0.42 | 0.28 | 0.40 | none | 19.6 | 20.5 | 1.7 |
| | 5 | 5 | 7 | 30 | 0.33 | 0.37 | 0.25 | 0.37 | none | 18.9 | 20.7 | 2.5 |
| | | | 8 | 60 | 0.30 | 0.39 | 0.28 | 0.35 | none | 19.2 | 21.0 | 2.4 |
| | | | 9 | 100 | 0.35 | 0.39 | 0.24 | 0.39 | none | 19.3 | 20.6 | 2.0 |
| | 2 | 8 | 10 | 30 | 0.32 | 0.38 | 0.25 | 0.43 | none | 18.5 | 21.3 | 2.4 |
| | | | 11 | 60 | 0.34 | 0.40 | 0.26 | 0.37 | none | 18.6 | 21.2 | 2.2 |
| | | | 12 | 100 | 0.35 | 0.39 | 0.22 | 0.38 | none | 19.0 | 21.8 | 1.9 |

TABLE 2

| lubricant | mixing ratio amine | mixing ratio alcohol | Example | Evaluation 2 bonded proportion % | coefficient of dynamic friction $\mu I$ | coefficient of dynamic friction $\mu L$ | Evaluation 3 CSS $\mu I$ | Evaluation 3 CSS $\mu L$ | head contamination | Evaluation 4 migration inner portion | Evaluation 4 migration outer portion | Evaluation 5 $SO_2$ adsorption $\mu g/m^2$ |
|---|---|---|---|---|---|---|---|---|---|---|---|---|
| diethyl- | 10 | 0 | 13 | 30 | 0.33 | 0.43 | 0.22 | 0.40 | none | 19.2 | 20.5 | 2.8 |
| amine | | | 14 | 60 | 0.33 | 0.41 | 0.23 | 0.41 | none | 19.6 | 20.3 | 2.3 |
| end group/ | | | 15 | 100 | 0.36 | 0.45 | 0.21 | 0.36 | none | 19.5 | 20.0 | 1.5 |
| alcohol | 8 | 2 | 16 | 30 | 0.37 | 0.43 | 0.26 | 0.35 | none | 19.4 | 20.5 | 2.5 |
| end group | | | 17 | 60 | 0.33 | 0.38 | 0.24 | 0.39 | none | 19.4 | 20.2 | 2.3 |
| | | | 18 | 100 | 0.35 | 0.40 | 0.25 | 0.44 | none | 19.7 | 20.1 | 1.9 |
| | 5 | 5 | 19 | 30 | 0.35 | 0.38 | 0.27 | 0.42 | none | 18.5 | 20.9 | 2.9 |
| | | | 20 | 60 | 0.34 | 0.43 | 0.23 | 0.38 | none | 19.3 | 20.9 | 2.6 |
| | | | 21 | 100 | 0.36 | 0.41 | 0.26 | 0.44 | none | 19.6 | 20.6 | 1.9 |
| | 2 | 8 | 22 | 30 | 0.31 | 0.39 | 0.28 | 0.39 | none | 18.2 | 21.5 | 2.7 |
| | | | 23 | 60 | 0.32 | 0.39 | 0.24 | 0.42 | none | 19.0 | 21.3 | 2.6 |
| | | | 24 | 100 | 0.36 | 0.43 | 0.25 | 0.39 | none | 19.5 | 21.0 | 2.0 |

TABLE 3

| lubricant | mixing ratio amine | mixing ratio alcohol | Example | Evaluation 2 bonded proportion % | coefficient of dynamic friction $\mu I$ | coefficient of dynamic friction $\mu L$ | Evaluation 3 CSS $\mu I$ | Evaluation 3 CSS $\mu L$ | head contamination | Evaluation 4 migration inner portion | Evaluation 4 migration outer portion | Evaluation 5 $SO_2$ adsorption $\mu g/m^2$ |
|---|---|---|---|---|---|---|---|---|---|---|---|---|
| diphenyl- | 10 | 0 | 25 | 30 | 0.32 | 0.38 | 0.20 | 0.38 | none | 19.5 | 20.6 | 2.9 |
| methylamine | | | 26 | 60 | 0.33 | 0.35 | 0.22 | 0.37 | none | 19.4 | 20.3 | 2.4 |
| end group/ | | | 27 | 100 | 0.30 | 0.36 | 0.24 | 0.38 | none | 19.3 | 20.3 | 1.6 |
| alcohol | 8 | 2 | 28 | 30 | 0.34 | 0.40 | 0.23 | 0.39 | none | 19.3 | 20.6 | 3.0 |
| end group | | | 29 | 60 | 0.33 | 0.39 | 0.23 | 0.40 | none | 19.5 | 20.3 | 2.6 |
| | | | 30 | 100 | 0.33 | 0.41 | 0.24 | 0.41 | none | 19.8 | 20.4 | 1.5 |

TABLE 3-continued

| lubricant | mixing ratio amine | mixing ratio alcohol | Example | bonded proportion % | Evaluation 2 coefficient of dynamic friction μI | Evaluation 2 coefficient of dynamic friction μL | Evaluation 3 coefficient of dynamic friction CSS μI | Evaluation 3 coefficient of dynamic friction CSS μL | Evaluation 3 head contamination | Evaluation 4 migration inner portion | Evaluation 4 migration outer portion | Evaluation 5 SO2 adsorption μg/m2 |
|---|---|---|---|---|---|---|---|---|---|---|---|---|
| | 5 | 5 | 31 | 30 | 0.30 | 0.39 | 0.23 | 0.37 | none | 18.9 | 21.0 | 2.6 |
| | | | 32 | 60 | 0.29 | 0.38 | 0.26 | 0.39 | none | 19.0 | 21.2 | 2.8 |
| | | | 33 | 100 | 0.33 | 0.40 | 0.25 | 0.37 | none | 19.5 | 21.0 | 1.7 |
| | 2 | 8 | 34 | 30 | 0.34 | 0.43 | 0.25 | 0.36 | none | 18.6 | 21.7 | 2.6 |
| | | | 35 | 60 | 0.33 | 0.42 | 0.26 | 0.40 | none | 19.3 | 21.3 | 2.5 |
| | | | 36 | 100 | 0.31 | 0.41 | 0.23 | 0.38 | none | 19.7 | 21.2 | 2.2 |

The liquid lubricant coated on the carbon protective layer of the magnetic recording medium in the invention comprises a perfluoropolyether lubricant having a functional end group(s) exhibiting weak basicity and possessing conjugated bond and a perfluoropolyether having an alcohol end group (s). As a result, the lubricant in the invention provides not only physical adsorption, but also strong inter-molecular bonding with the characteristic of chemical adsorption in the boundary region between the carbon protective layer and the lubricant layer, and nevertheless, retains flexibility owned by a liquid lubricant.

In addition, the high covering rate obtained with the surface in the invented medium prevents external contaminant gas from adsorbing on the surface. Thus, the; magnetic recording medium is provided which exhibits excellent lubricating characteristics to the magnetic head for low floating-height and excellent stability in operating characteristics for a prolonged time.

The invention has been described with reference to certain preferred embodiments thereof. It will be understood, however, that modifications and variations are possible within the scope of the appended claims.

What is claimed is:

1. A magnetic recording medium comprising:
   a base body;
   a non-magnetic metal underlayer formed on the base body;
   a magnetic layer formed on the non-magnetic metal layer;
   a protective layer formed on the magnetic layer; and
   a lubricant layer formed on the protective layer, the lubricant layer containing a first liquid lubricant and a second liquid lubricant, wherein the first liquid lubricant contains at least one perfluoropolyether having one or two alcohol end groups, selected from a group consisting of perfluoropolyethers represented by general formulas (I), (II) and (III), the general formulas (I), (II) and (III) being expressed by

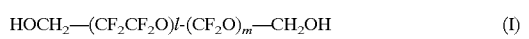

where each of l and m is 0 or an integer excepting the case l=m=0, and n is an integer, and
   the second liquid lubricant contains at least one perfluoropolyether having one or two tertiary amine end groups, selected from a group consisting of perfluoropolyethers represented by general formulas (IV), (V) and (VI), the general formulas (IV), (V) and (VI) being expressed by

where R is independently Chemical Formula 3, Chemical Formula 4, or Chemical Formula 5,

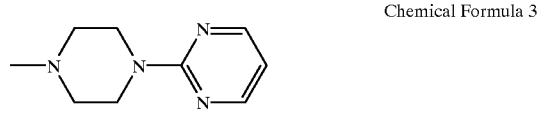

Chemical Formula 3

Chemical Formula 4

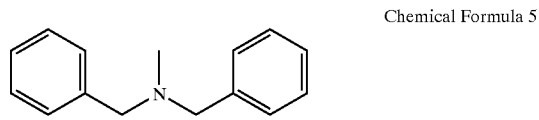

Chemical Formula 5 and each of l, m, p and q is 0 or an integer excepting the case l=m=0, and n is an integer.

2. A magnetic recording medium according to claim 1, wherein the lubricant layer is formed of a mixed liquid lubricant including the first liquid lubricant and the second liquid lubricant.

3. A magnetic recording medium according to claim 1, wherein the lubricant layer is consisted of a double layer including a first layer formed of the first liquid lubricant and a second layer formed of the second liquid lubricant.

4. A magnetic recording medium according to claim 2, wherein the lubricant layer includes a bonded portion and a mobile portion, the bonded portion being in a proportion of 30 to 100% with respect to a sum of the bonded portion and the mobile portion.

5. A magnetic recording medium according to claim 3, wherein the lubricant layer includes a bonded portion and a mobile portion, the bonded portion being in a proportion of 30 to 100% with respect to a sum of the bonded portion and the mobile portion.

6. A magnetic recording medium according to claim 2, wherein the second liquid lubricant has a weight average molecular weight of 1,500 to 15,000.

7. A magnetic recording medium according to claim 3, wherein the second liquid lubricant has a weight average molecular weight of 1,500 to 15,000.

8. A magnetic recording medium according to claim 5, wherein the first liquid lubricant has a weight average molecular weight of 1,500 to 5,500.

9. A method for manufacturing a magnetic recording medium comprising steps of:
  laminating a non-magnetic metal underlayer on a base body;
  laminating a magnetic layer on the non-magnetic metal underlayer;
  laminating a protective layer on the magnetic layer; and
  laminating a lubricant layer on the protective layer by applying a first liquid lubricant and a second liquid lubricant;
  wherein the first liquid lubricant contains at least one perfluoropolyether having one or two alcohol end groups, selected from a group consisting of perfluoropolyethers represented by general formulas (I), (II) and (III), the general formulas (I), (II) and (III) being expressed by $$HOCH_2-(CF_2CF_2O)_l-(CF_2O)_m-CH_2OH \quad (I)$$

$$F(CF_2CF_2CF_2O)_n-CH_2OH \quad (II)$$

$$F(CF_2CF_2O)_n-CH_2OH \quad (III)$$

where each of l and m is 0 or an integer excepting the case l=m=0, and n is an integer, and
  the second liquid lubricant contains at least one perfluoropolyether having one or two tertiary amine end groups, selected from a group consisting of perfluoropolyethers represented by general formulas (IV), (V) ad (VI), the general formulas (IV), (V) and (VI) being expressed by $$RN-(CH_2)_p-(CF_2CF_2O)_l-(CF_2O)_m-(CH_2)_q-NR \quad (IV)$$

$$F(CF_2CF_2CF_2O)_n-(CH_2)_p-NR \quad (V)$$

$$F(CF_2CF_2O)_n-(CH_2)_p-NR \quad (VI)$$

where R is independently Chemical Formula 3, Chemical Formula 4, or Chemical Formula 5,

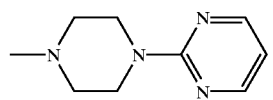

Chemical Formula 3

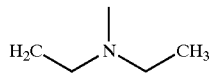

Chemical Formula 4

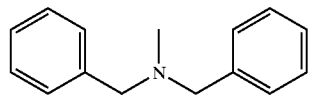

Chemical Formula 5 and each of l, m, p and q is 0 or an integer excepting the case l=m=0, and n is an integer.

10. A method for manufacturing a magnetic recording medium according to claim 9, wherein the step of laminating a lubricant layer is a step of applying a mixed liquid lubricant including the first liquid lubricant and the second liquid lubricant.

11. A method for manufacturing a magnetic recording medium according to claim 10, wherein the step of laminating a lubricant layer is a step of applying diluted mixed liquid by means of dip-coating or spin-coating, the diluted mixed liquid being a mixture of the first liquid lubricant and the second liquid lubricant diluted with a solvent.

12. A method for manufacturing a magnetic recording medium according to claim 9, wherein the step of laminating a lubricant layer comprises a step of applying a liquid including the first liquid lubricant and a separate step of applying a liquid including the second liquid lubricant.

13. A method for manufacturing a magnetic recording medium according to claim 12, wherein the step of applying the liquid including the first liquid lubricant is a step of applying diluted liquid by means of dip-coating or spin-coating, the diluted liquid being the first liquid lubricant diluted with a solvent and the step of applying the liquid including the second liquid lubricant is a step of applying diluted liquid by means of dip-coating or spin-coating, the diluted liquid being the second liquid lubricant diluted with a solvent.

14. A method for manufacturing a magnetic recording medium according to claim 9 further comprising a step of heating or ultraviolet ray irradiation such that a bonded portion in the lubricant layer is in a proportion of 30 to 100% with respect to a sum of the bonded portion and a mobile portion.

15. A method for manufacturing a magnetic recording medium according to claim 10 further comprising a step of heating or ultraviolet ray irradiation such that a bonded portion in the lubricant layer is in a proportion of 30 to 100% with respect to a sum of the bonded portion and a mobile portion.

16. A method for manufacturing a magnetic recording medium according to claim 11 further comprising a step of heating or ultraviolet ray irradiation such that a bonded portion in the lubricant layer is in a proportion of 30 to 100% with respect to a sum of the bonded portion and a mobile portion.

17. A method for manufacturing a magnetic recording medium according to claim 12 further comprising a step of heating or ultraviolet ray irradiation such that a bonded portion in the lubricant layer is in a proportion of 30 to 100% with respect to a sum of the bonded portion and a mobile portion.

18. A method for manufacturing a magnetic recording medium according to claim 13 further comprising a step of heating or ultraviolet ray irradiation such that a bonded portion in the lubricant layer is in a proportion of 30 to 100% with respect to a sum of the bonded portion and a mobile portion.

* * * * *

UNITED STATES PATENT AND TRADEMARK OFFICE
CERTIFICATE OF CORRECTION

PATENT NO. : 6,645,634 B1
DATED : November 11, 2003
INVENTOR(S) : Shinji Shirai et al.

It is certified that error appears in the above-identified patent and that said Letters Patent is hereby corrected as shown below:

Column 16,
Chemical Formula 4, please delete "$H_2C$" and insert -- $H_3C$ --.

Column 17,
Chemical Formula 4, please delete "$H_2C$" and insert -- $H_3C$ --.

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,634 B1
DATED : November 11, 2003
INVENTOR(S) : Shirai et al.

It is certified that error appears in the above-identified patent and that said Letters Patent is hereby corrected as shown below:

Column 16,
Line 16, formula (IV), "—NR" should read -- —R --.
Line 18, formula (V), "—NR" should read -- —R --.
Line 20, formula (VI), "—NR" should read -- —R --.

Column 17,
Line 31, formula (IV), "—NR" should read -- —R --.
Line 33, formula (V), "—NR" should read -- —R --.
Line 35, formula (VI), "—NR" should read -- —R --.

Signed and Sealed this

Twenty-eighth Day of February, 2006

JON W. DUDAS
*Director of the United States Patent and Trademark Office*